April 1, 1969  W. L. CHAPMAN  3,435,797
COMPRESSED AIR, PRESSURE-SENSING ACTUATOR
Filed May 3, 1967
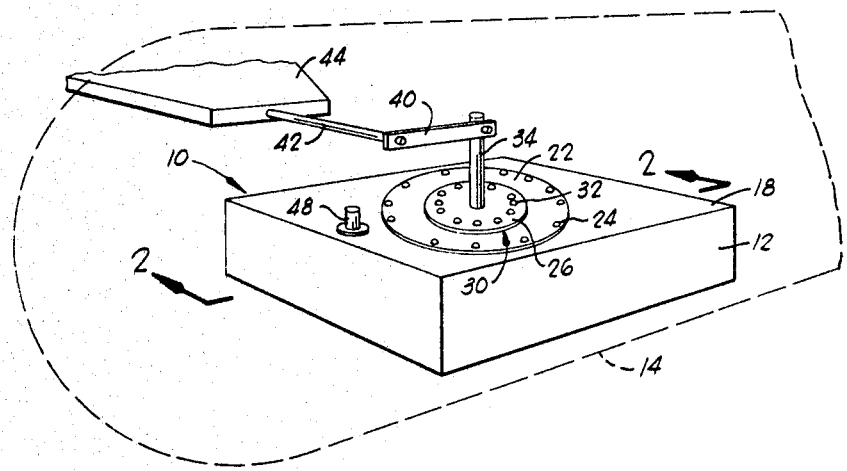
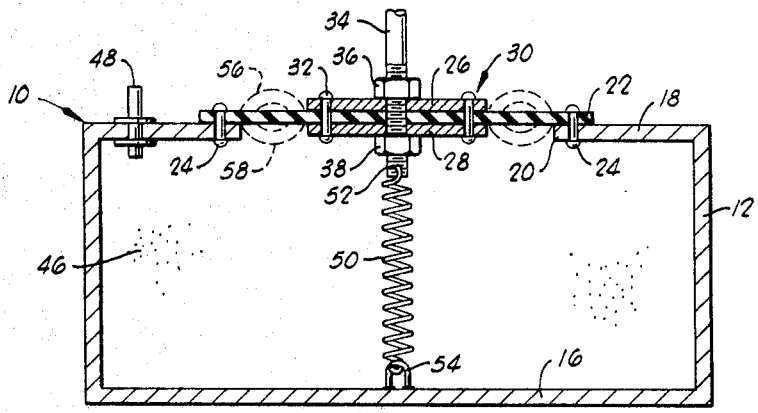
INVENTOR.
WILLIAM L. CHAPMAN
BY
William J. Miller
ATTORNEY United States Patent Office 3,435,797
Patented Apr. 1, 1969

3,435,797
COMPRESSED AIR, PRESSURE-SENSING ACTUATOR
William L. Chapman, Ponca City, Okla., assignor to Continental Oil Company, a corporation of Delaware
Filed May 3, 1967, Ser. No. 635,861
Int. Cl. B63b *21/56;* B63g *8/14;* G01l *7/08*
U.S. Cl. 114—235                                    2 Claims

ABSTRACT OF THE DISCLOSURE

An automatic depth controller for a paravane having one or more diving planes and adapted to be towed through water. The apparatus utilizes a compressed air chamber separated from the water by a flexible diaphragm carrying a piston in order that the piston, which is connected to the paravane diving plane or planes, will move in response to variations in pressure between the compressed air chamber and the static pressure of the water. A biasing spring is anchored between the piston and a wall of the air chamber to eliminate hysteresis effect of the diaphragm when exposed to minor pressure differentials and to preposition the piston at discreet pressure differentials.

CROSS REFERENCES TO RELATED APPLICATIONS

This invention is particularly suited for use in a paravane used on a marine seismic cable as disclosed in the copending application of Jimmy Ray Cole and Paul L. Buller entitled, "Seismic Cable Depth Control Apparatus," filed Dec. 27, 1967, Ser. No. 604,874, now abandoned and assigned to the assignee of this invention.

BACKGROUND OF THE INVENTION

Field of the invention

This invention relates to improvements in actuators for sensing and indicating differences in pressure and more particularly, but not by way of limitation, to a depth control mechanism for a paravane being towed through water.

Description of the prior art

Various paravanes having an adjustable diving plane or planes have been designed in the past for operating at a predetermined depth when towed through water. An important use of paravanes is in connection with marine seismic detector cables which are towed through water, preferably at a predetermined depth. Examples of such paravanes are disclosed in the above-mentioned copending application and in the U.S. patent of LeRoy C. Paslay, No. 2,465,696.

Such paravanes contain some mechanism for sensing the depth of operation of the paravane and at least attempt to adjust the diving plane or planes upon variations in depth of operation, however, prior to the present invention, a satisfactory depth controller has not been available. For example, such paravanes have been designed to utilize a piston having one end exposed to the water pressure and a mechanical spring resisting the force provided by the water pressure. However, the use of a mechanical spring unit which is continuously adjustable over a large depth range requires long dimensions for the restoring spring. For large piston areas, the force load on the spring is high which in turn demands large, heavy springs with high spring constants. The use of a diaphragm-supported piston and compressed air for the restoring force has also been proposed, but it has been found that the piston is unstable when supported only by a diaphragm, as will be discussed further below.

SUMMARY OF THE INVENTION

The present invention contemplates an actuator which is responsive to changes in the pressure of a fluid to which the actuator is exposed, including a hollow housing having a body of air therein and a flexible diaphragm sealed around an aperture formed in one wall of the housing. A piston is carried by the flexible diaphragm and a spring is connected to the piston, biasing the diaphragm in one direction, whereby the piston comes to a predetermined position at each discreet difference in pressure between the air in the housing and the pressure of the fluid to which the actuator is exposed.

An object of the invention is to provide an accurate depth control for a paravane.

Another object of the invention is to provide a compressed air, pressure-sensing actuator using a flexible diaphragm wherein the unsupported portion of the diaphragm will be maintained in a known position throughout the operating range of the actuator.

A further object of the invention is to provide a paravane depth control which is of economical construction and will have a long and trouble-free service life.

A still further object of the invention is to provide a paravane depth control which may be easily adjusted for varying the operating depth of the paravane.

Other objects and advantages of the invention will be evident from the following description when read in conjunction with the accompanying drawing which illustrates the preferred embodiment of the invention.

BRIEF DESCRIPTION OF THE DRAWING

FIG. 1 is a perspective view of an actuator constructed in accordance with this invention schematically illustrated as being connected to the diving plane of a paravane, and with a portion of the outline of the paravane being shown in dashed lines.

FIG. 2 is a sectional view taken along lines 2—2 of FIG. 1 with the paravane structure removed.

DESCRIPTION OF THE PREFERRED EMBODIMENT

An actuator 10 constructed in accordance with this invention comprises a hollow housing 12 of any desired cross sectional configuration to adapt to the environment in which it is used. For example, when the housing 12 is mounted in a paravane, as partially indicated by dashed lines at 14 in FIG. 1, the housing 12 may be substantially rectangular or box-shaped as illustrated in the drawing, or the bottom wall 16 of the housing may be curved to conform with a wall of the paravane 14. In any event, the housing 12 is supported with at least one wall 18 thereof, which has an aperture 20 therein, exposed to the pressure of a fluid, such as the static pressure of water when the actuator 10 is used in a paravane 14. It should further be noted that the walls of the housing 12 are formed of a relatively rigid material, such as a metal, such that the walls will not flex under the pressures to be encountered.

A flexible diaphragm 22 completely covers the aperture 20 and has its outer edge secured to the wall 18 around the aperture 20 by suitable fasteners 24. Also, the outer edge of the diaphragm 22 is preferably cemented or bonded to the wall 18 to assure that the outer edge of the diaphragm is effectively sealed to the wall 18 around the aperture 20.

Upper and lower plates 26 and 28, formed of metal or the like, are secured on opposite sides of the diaphragm 22 in superimposed relation to form what is sometimes referred to herein as a piston 30. The plates 26 and 28 have transverse dimensions less than the transverse dimensions of the aperture 20 to move inwardly and outwardly through the aperture 20, and the plates 26 and 28 are suitably interconnected, such as by fasteners 32, to move as a unit and form the piston 30. Also, the plates 26 and 28 may be cemented or bonded to the respective inner and outer surfaces of the diaphragm 22 if desired.

An actuating rod 34 extends through mating apertures in the plates 26 and 28 and the diaphragm 22 and is secured in a fixed position with respect to the piston 30, as by means of upper and lower nuts 36 and 38 threaded on the rod tightly against the plates 26 and 28. The rod 34, therefore, moves with the piston 30 and is connected to any desired indicating or control system, depending upon the use of the actuator 10. For example, when the actuator 10 is used in a parvane 14, the rod 34 may be pinned to a cross arm 40 which is in turn rigidly secured to the shaft 42 of one or more diving planes 44 of the paravane, such that the diving plane 44 will be adjusted upon vertical movement of the rod 34.

The housing 12 contains a body of air 46 to react on the diaphragm 22 and the piston 30 in opposition to the pressure of the fluid to which the wall 18 is exposed. The pressure of the air 46 in the housing 12 may be adjusted by means of a suitable valve 48 extending through a wall of the housing 12. The valve 48 may be, for example, the same type that is conventionally used on automobile tubes and tires, such that the pressure in the housing 12 may be increased by use of a conventional air hose attached to the valve 48 and the valve 48 may be easily opened to reduce the air pressure in the housing 12.

A tension spring 50 has one end anchored to the piston 30, as by extension through an aperture 52 in the inner end of the actuating rod 34, and the opposite end of the spring 50 is suitably anchored in a stationary position, as to one wall of the housing 12 by a conventional hook-type anchor 54. The spring 50 is only of such strength to provide a continuously biasing force on the diaphragm 22 throughout the operating range of the actuator 10, as will be described further below.

OPERATION

A specific operation and use of the actuator 10 will be described in connection with a paravane 14, since this is the use of the actuator 10 primarily intended, although it is to be understood that the actuator 10 could be used in other environments, such as in connection with apparatus to indicate the height of an airplane or the pressure of a fluid.

As previously stated, the wall 18 of the housing 12 is exposed to the static pressure of the water through which the paravane 14 is being towed, and, as is well known in the art, the static pressure of the water varies with depth. Thus, the pressure of the air 46 in the housing 12 is adjusted by means of the air valve 48, to substantially equal the static pressure at the desired operating depth of the paravane 14. The object is to maintain the diving plane 44 at such an attitude that the paravane 14 will remain at a predetermined depth, and to adjust the diving plane 44 to return the paravane 14 to the predetermined depth in the event the paravane 14 is inadvertently either moved upwardly or downwardly in the water.

Assuming that the diving plane 44 is extended horizontally to maintain the paravane 14 at a uniform depth, the pressure of the air 46 in the housing 12 is adjusted to be equal to the static pressure of the water at the desired operating depth of the paravane before the paravane is placed in the water. When the paravane 14 is in the water, but above the desired operating depth, the pressure in the housing 12 will be greater than the static pressure of the water, and the actuating rod 34 will be moved outwardly with respect to the housing 12 by virtue of the differential pressure across the diaphragm 22 and the piston 30. The linkage of the actuator rod 34 to the diving plane 44, will, of course, be constructed to place the diving plane 44 in a diving attitude under these operating conditions to lower the paravane 14 to the desired operating depth. Conversely, if the paravane 14 is moved to a depth below the desired operating depth, the static pressure of the water will be greater than the pressure in the housing 12. Thus, the actuating rod 34 will be moved inwardly with respect to the housing 12 by the oppositely directed pressure differential across the diaphragm 22 and piston 30. This movement of the actuating rod 34 is transmitted to shift the diving plane 44 to a "surfacing" attitude to react with the water and move the paravane 14 upwardly to the desired operating depth.

It has been found that when no biasing spring is used on the piston 30, the unreinforced or unsupported portion of of the diaphragm 22 between the outer edge of the piston 30 and the walls of the aperture 20 may assume various positions, as indicated by the dashed line positions 56 and 58, which is believed to be due to the low pressure differentials which may appear across the diaphragm 22 during operation. At any rate, the inadvertent flexing of the unsupported portion of the diaphragm 22 gives rise to what may be characterized as an hysteresis effect in operation of the actuator. That is, there is a range of positions of the diaphragm 22 for any static pressure, or a range of static pressures for a fixed diaphragm position. This hysteresis is eliminated by using a bias spring, such as the spring 50. The magnitude of the force bias applied by the spring 50 is such that a pressure will appear across the diaphragm 22 throughout the operating range of the actuator 10. With use of the spring 50, the unsupported portion of the diaphragm 22 will bulge outwardly as indicated by the dashed lines 56 throughout the operating range of the actuator 10. This will assure that the piston 30 will be in a known position for each static pressure reacting on the outer side of the piston and diaphragm, and the piston may be closely controlled.

The operating range may be defined as the depth range within which the paravane is maintained. For example, it has been found that when using a piston 30 of a diameter of 3 inches in an actuator used in a paravane, the paravane will be maintained within plus or minus 2 feet of the desired depth, such as 30 feet. The spring 50 is designed in this example to exert a force of approximately 5 pounds on the piston 30 when the paravane is in the desired operating range, and the hysteresis effect referred to above is effectively eliminated.

It should also be noted here that the spring 50 is illustrated in the drawing as being a tension spring applying a biasing force urging the piston inwardly with respect to the housing 12, although it is to be understood that the spring 50 may be a compression spring or a tension spring located at another point and provide a biasing force urging the piston 30 outwardly with respect to the housing 12, with equal results. In this latter event, the unsupported portion of the diaphragm 22 will bulge inwardly as indicated by the dashed lines 58 in the operating range of the paravane.

The diaphragm 22 has been previously characterized as a flexible material, and the composition thereof may vary, depending upon the environment in which the actuator 10 is used. For example, the diaphragm 22 may be an elastomeric material, such as neoprene, when the actuator 10 is used in a paravane 10 where the diaphragm is exposed to seawater.

From the foregoing, it will be apparent that the present invention provides a novel actuator containing a moveable piston wherein the piston will be maintained in a predetermined position when exposed to a predetermined pressure differential and will quickly and accurately respond to changes in the pressure differential across the piston. With this invention, the operating depth of a paravane may be accurately controlled. It will also be apparent that the actuator of this invention may be economically constructed, will have a long service life and may be easily repaired.

What is claimed is:

1. An actuator responsive to changes in the pressure of a fluid exposed thereto, comprising:
 a hollow housing having a body of air therein, one wall thereof exposed to the pressure of said fluid, and an aperture in said one wall;

a piston having an inner and outer end;

a flexible disc diaphragm sealed to the piston and said one wall around said aperture to expose the inner end of the piston to the pressure of said fluid, and to accommodate movement of the piston in response to differences in said pressures; and wherein said disc diaphragm is secured to said piston by superimposed rigid metal plates secured on the opposite sides of the central portion of said disc diaphragm; and, a tension spring anchored to said piston and said housing urging said piston toward the interior of said housing and biasing the one support portion of said disc diaphragm outwardly with respect to the housing.

2. A depth control for an underwater paravane having at least one diving plane adjustable to vary the depth of the paravane, comprising:

a hollow housing having a body of air therein under pressure and supported with one wall thereof exposed to the static pressure of the water in which the paravane is operated, said one wall having an aperture therein;

a piston having an inner end and an outer end;

a flexible disc diaphragm sealed to the piston and said one wall around said aperture to expose the inner end of the piston to the pressure of the air in the housing and the outer end of the piston to the static pressure of the water in which the paravane is operated, and to accommodate movement of the piston in response to differences in said pressures, wherein said piston has superimposed rigid metal plates secured on the opposite sides of the central portion of said disc diaphragm; and a tension spring means anchored to the piston and the housing urging said piston toward the interior of the housing and biasing the unsupported portion of the diaphragm outwardly with respect to the housing.

References Cited
UNITED STATES PATENTS

| | | | |
|---|---|---|---|
| 1,500,114 | 7/1924 | Dieter | 114—125 |
| 2,379,299 | 6/1945 | Heintz | 92—100 |
| 2,709,981 | 6/1955 | Wilcoxon | 114—235 |
| 2,729,910 | 1/1956 | Fryklund | 114—235 X |
| 2,945,469 | 7/1960 | Pulsifer | 114—235 |

TRYGVE M. BLIX, *Primary Examiner.*

U.S. Cl. X.R.

181—.5; 73—408